(12) United States Patent
Viola et al.

(10) Patent No.: US 7,610,750 B2
(45) Date of Patent: Nov. 3, 2009

(54) METHOD AND APPARATUS FOR MONITORING A UREA INJECTION SYSTEM IN AN EXHAUST AFTERTREATMENT SYSTEM

(75) Inventors: Michael B. Viola, Macomb Township, MI (US); David B. Brown, Brighton, MI (US); Michael J. Paratore, Jr., Howell, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/459,673

(22) Filed: Jul. 25, 2006

(65) Prior Publication Data

US 2008/0022658 A1 Jan. 31, 2008

(51) Int. Cl.
*F01N 3/00* (2006.01)
(52) U.S. Cl. .............................. 60/286; 60/277; 60/297; 60/301; 60/303
(58) Field of Classification Search .................. 60/274, 60/276, 286, 295, 297, 301, 303, 277
See application file for complete search history.

(56) References Cited

U.S. PATENT DOCUMENTS

| | | | |
|---|---|---|---|
| 6,017,503 A | 1/2000 | Kato | |
| 6,532,736 B2 | 3/2003 | Hammerle et al. | |
| 6,662,553 B2 * | 12/2003 | Patchett et al. | 60/286 |
| 6,698,191 B2 | 3/2004 | Xu | |
| 6,701,707 B1 * | 3/2004 | Upadhyay et al. | 60/277 |
| 6,742,326 B2 * | 6/2004 | Xu et al. | 60/284 |
| 6,755,014 B2 * | 6/2004 | Kawai et al. | 60/286 |
| 6,761,025 B1 | 7/2004 | Gladden | |
| 6,959,540 B2 * | 11/2005 | Itoh et al. | 60/286 |
| 7,065,958 B2 * | 6/2006 | Funk et al. | 60/286 |
| 7,134,273 B2 * | 11/2006 | Mazur et al. | 60/286 |
| 7,178,328 B2 * | 2/2007 | Solbrig | 60/286 |
| 2004/0040284 A1 | 3/2004 | Upadhyay et al. | |
| 2004/0074229 A1 | 4/2004 | Upadhyay et al. | |
| 2007/0044456 A1 * | 3/2007 | Upadhyay et al. | 60/295 |

* cited by examiner

*Primary Examiner*—Binh Q. Tran

(57) ABSTRACT

A monitoring system for an exhaust aftertreatment system is provided, comprising an injecting device operable to inject reductant into an exhaust gas feedstream upstream of a selective catalyst reduction device. The monitoring system comprises a control module, adapted to selectively intrusively control a rate of dosing from the injecting device and, monitor inputs from a sensing device. The sensing device can comprise an ammonia sensor, and, alternatively, a NOx sensor. The control module is adapted to discontinue the rate of dosing, and substantially increase and decrease the rate of dosing for a predetermined amount of time, and to identify a fault in the sensing device and the selective catalyst reduction device.

20 Claims, 9 Drawing Sheets

METHOD AND APPARATUS FOR MONITORING A UREA INJECTION SYSTEM IN AN EXHAUST AFTERTREATMENT SYSTEM

TECHNICAL FIELD

This invention pertains generally to exhaust aftertreatment systems for internal combustion engines.

BACKGROUND OF THE INVENTION

Manufacturers of internal combustion engines are continually developing new engine control strategies to satisfy customer demands and meet various regulations. One such engine control strategy comprises operating an engine at an air/fuel ratio that is lean of stoichiometry to improve fuel economy and reduce greenhouse gas emissions. Such engines include both compression-ignition (diesel) and lean-burn spark-ignition engines. When an engine operates in a region lean of stoichiometry, a resultant typically includes increased combustion temperatures, leading to increased NOx emissions.

One proposed type exhaust aftertreatment system and control strategy for managing and reducing NOx emissions includes injection of urea into an exhaust gas feedstream upstream of a selective catalytic reduction ('SCR') catalytic device to cause a reduction of NOx exhaust gases to nitrogen and oxygen, among other gases.

Effective control of rate of injection of urea is required to reduce engine-out NOx emissions. A urea injection rate preferably matches an engine-out NOx emissions rate for optimum NOx reduction. Typical urea injection control systems currently in use are not capable of controlling urea injection at very low flow rates, which typically occur at engine idle conditions and when a vehicle is decelerating, i.e. conditions when the engine is producing very low engine-out NOx emissions. A typical urea-SCR catalyst has a capacity to store ammonia, which comprises urea which has decomposed on the catalyst surface. The catalyst is able to continue NOx reduction when the urea injection control system is not capable of controlled dosing, i.e., supplying a controlled amount of urea. The stored ammonia reacts with the NOx emissions on the catalyst surface to produce nitrogen, i.e. $N_2$.

A fault occurring in an exhaust aftertreatment system employing a urea injection system leads to the system not operating as intended, resulting in customer dissatisfaction. Furthermore, state and federal regulations impose requirements to monitor operation of emissions devices such as the urea injection system, including diagnosing presence of a fault and informing a vehicle operator of the presence of the fault, under closely regulated conditions. System elements requiring monitoring include sensing device, actuators, electrical circuits, and catalyst devices. Monitoring conditions can include presence of open or short circuits, out-of-range/rationality checking, and proper functional response to inputs. Therefore, there is a need to effectively monitor a urea injection system in a powertrain system so equipped.

SUMMARY OF THE INVENTION

In accordance with an embodiment of the invention, a method and monitoring system for an exhaust aftertreatment system is provided. A control module controls an injecting device operable to inject reductant into an exhaust gas feedstream upstream of a selective catalyst reduction device. The monitoring system is adapted to control a rate of dosing from the injecting device and, monitor inputs from a sensing device operative to monitor the selective catalyst reduction device. The sensing device can include an ammonia sensor, and, alternatively, a NOx sensor. Controlling the rate of dosing from the injecting device includes selectively intrusively controlling the rate of dosing from the injecting device, including substantially completely discontinuing the rate of dosing for a predetermined amount of time.

The control module may be adapted to determine a plurality of closed-loop correction factors to control the rate of reductant dosing by the injecting device. Each closed-loop correction factor is based upon the monitored signal inputs from the sensing device in an engine speed/load operating region. The control module identifies a fault in reductant quality when a change in one of the closed loop correction factors exceeds a predetermined threshold for the engine speed/load operating region.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE INVENTION

Figure 1:
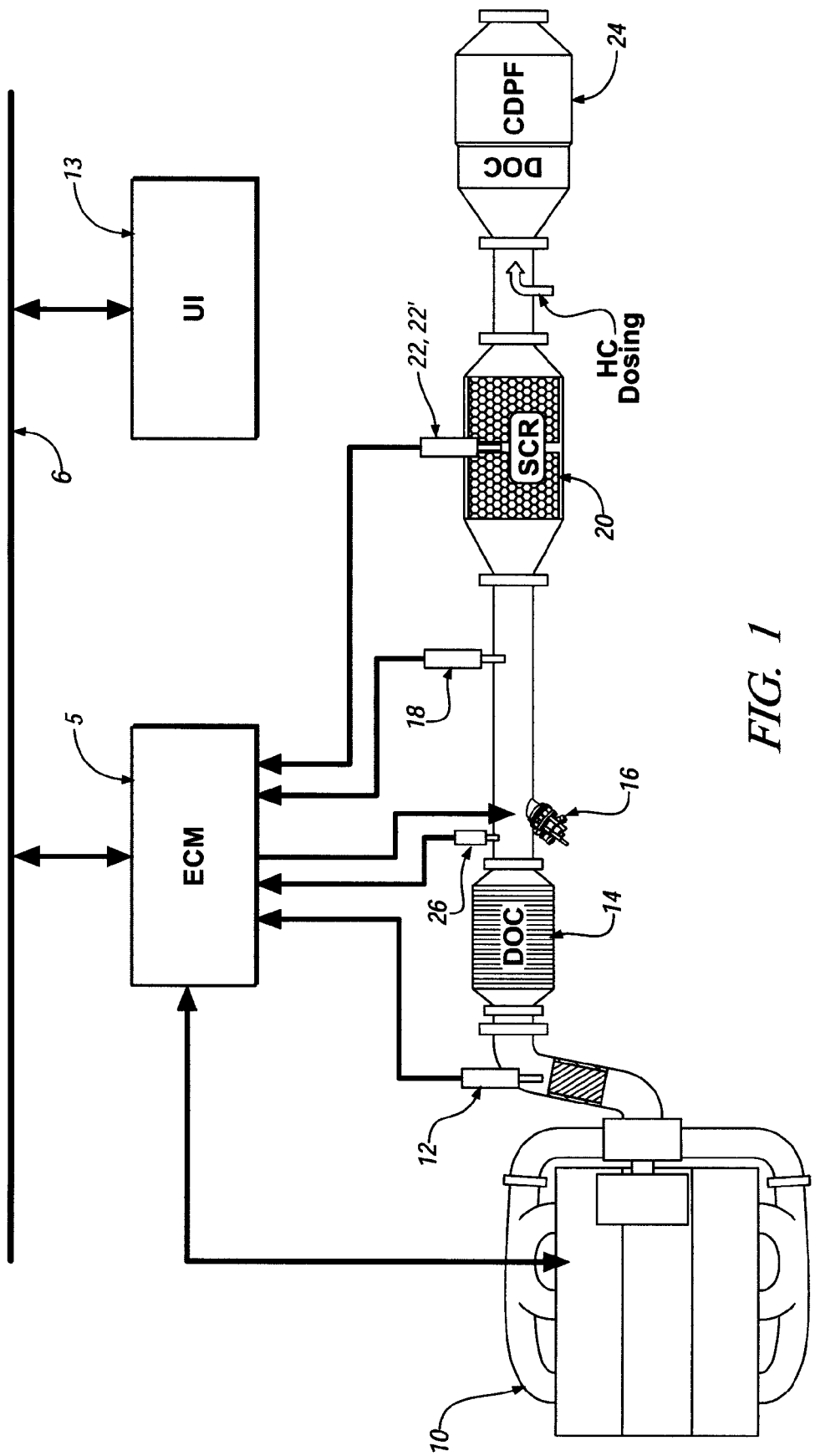
FIGS. 1 and 2 are schematic diagrams of a powertrain system, in accordance with the present invention.
Figure 2:
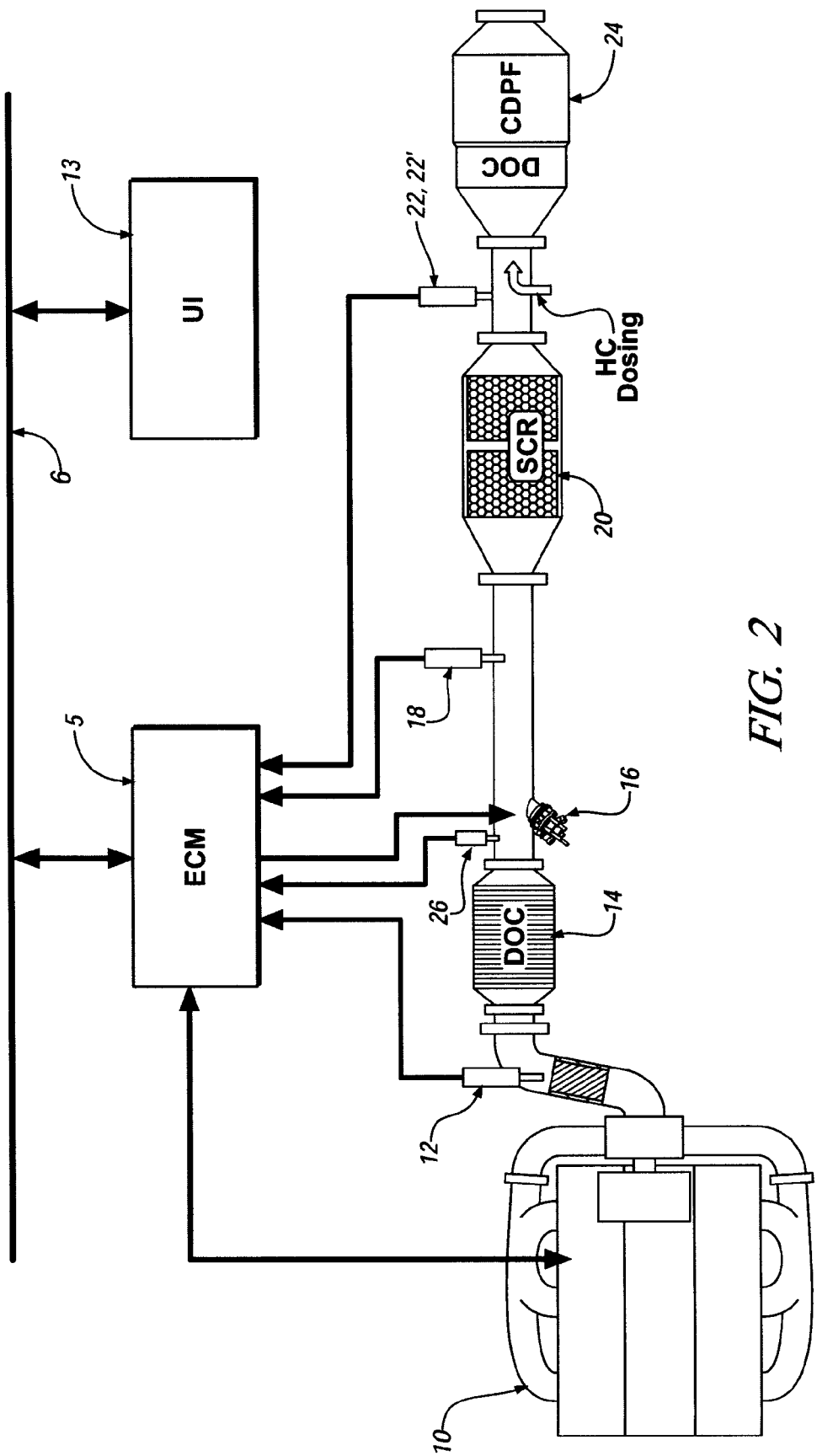

Referring now to the drawings, wherein the showings are for the purpose of illustrating the invention only and not for the purpose of limiting the same, FIGS. 1 and 2 comprise schematic diagrams depicting an internal combustion engine, exhaust aftertreatment system, and control system which has been constructed in accordance with embodiments of the present invention.

The exemplary engine and control system comprises a four-cycle internal combustion engine 10 and electronic engine control module 5. The exemplary engine comprises a diesel compression-ignition engine having an operating regime that is primarily lean of stoichiometry. Alternatively, the engine may comprise an engine using any one of a number of engine control strategies which operate lean of stoichiometry, e.g. homogeneous-charge compression-ignition engines, and lean-burn spark-ignition engines. The exemplary engine 10 includes a plurality of reciprocating pistons attached to a crankshaft, which is operably attached to a vehicle driveline to deliver tractive torque to the driveline. The engine generates an exhaust gas feedstream containing regulated constituent elements to be transformed by the aftertreatment system, typically including hydrocarbons ('HC'), carbon monoxide ('CO'), nitrides of oxygen ('NOx'), and particulate matter ('PM'), among others.

The exhaust aftertreatment system comprises an integrated system intended to convert the constituent elements of the exhaust gas feedstream to harmless gases. An exhaust manifold entrains and directs exhaust flow to the exhaust aftertreatment system. The exemplary aftertreatment system includes devices comprising an oxidation catalyst 14, a selective catalyst reduction ('SCR') catalyst 20, and a final catalyst 24 comprising a second oxidation catalyst combined with a diesel particulate filter ('DPF'). Referring specifically to FIG. 1, the SCR catalyst 20 is adapted to permit intermediate placement of an exhaust gas sensing device 22, 22' within the SCR catalyst device, enabling the exhaust gas sensing device 22, 22' to monitor exhaust gases after having passed through a front or forward portion of the SCR catalyst, and before having passed through the entire SCR catalyst device. Such monitoring can be accomplished, for example, when the SCR catalyst 20 comprises a catalyst system wherein there are two or more catalyst substrates assembled within a single SCR assembly and the sensing device, or a gas sampling device, is effective to monitor gas between the two substrates. Determining an effective portion of the catalyst to be monitored can be based upon urea-storage capacity of a specific catalyst formulation, including, e.g. concentrations and masses and surface areas of catalytic metals and washcoat materials. Selective placement of the sensing device 22, 22' within the SCR catalyst is determined based upon desired application-specific operating and control characteristics. For example, placement of the sensing device to monitor a front third of the SCR catalyst permits transient control with a relatively short lag time for response. Alternatively, placement of the sensing device to monitor a front two-thirds of the SCR catalyst permits utilization of a SCR catalyst having lower urea storage capacity. Referring specifically to FIG. 2, exhaust gas sensing device 22, 22' is mounted downstream of the SCR catalyst 20, enabling the exhaust gas sensing device 22, 22' to monitor exhaust gases after having passed completely through the SCR catalyst.

Each of the exhaust aftertreatment devices comprise a device which employs technologies having various capabilities for treating the constituent elements of the exhaust gas feedstream, including oxidation, selective catalyst reduction, and particulate filtering. The devices are preferably fluidly connected in series using known pipes and connectors.

The aftertreatment system includes sensing devices and systems. The sensing devices preferably include an exhaust gas sensor 12, preferably a NOx or other exhaust gas sensor operative to monitor exhaust gases exiting the engine, a temperature sensor 18 operative to measure temperature of exhaust gases from which temperature of the SCR catalyst 20 is determined, and a sensing system 26 operative to monitor the exhaust gas feedstream immediately upstream of a urea dosing injector 16. The sensing system 26 preferably comprises a NOx sensing device, or alternatively, a virtual NOx sensing system comprising an algorithm resident in the ECM 5 operative to determine a parametric value for concentration of NOx gas in the exhaust gas feedstream based upon engine speed/load operating characteristics. The exhaust gas sensing device designated as 22, 22' comprises a second sensor operative to monitor constituent elements of exhaust gases after having passed through all or a portion of the SCR catalyst 20. The second sensing device 22, 22' can comprise a NOx sensor operative to generate an electrical signal correlatable to a parametric value for NOx concentration in the exhaust gas feedstream. Alternatively, the second sensing device 22, 22' can comprise an ammonia ('NH$_3$') sensor 22', operative to generate an electrical signal correlatable to a parametric value for NH$_3$ concentration in the exhaust gas feedstream.

The exhaust aftertreatment system includes a urea injection system, including a refillable urea storage tank (not shown) fluidly connected to the urea dosing injector 16. The urea dosing injector 16 comprises a solenoid-operated fluid flow control valve that has a fluid outlet adapted to inject reductant, typically urea, into the exhaust gas feedstream downstream of the oxidation catalyst 14 and sensor 26 and upstream of the temperature sensor 18 and the SCR catalyst 20. The urea dosing injector 16 is operably connected to the control system through engine control module ('ECM') 5. The ECM 5 is adapted to control timing and quantity of urea injection into the exhaust gas feedstream. Details of the urea injection control system are described hereinafter.

The exhaust aftertreatment system may include a hydrocarbon ('HC') dosing device for injecting a controlled amount of HC upstream of the diesel particulate filter ('DPF') after the second oxidation catalyst. The HC dosing device is operably connected to the ECM 5, which is adapted to control timing and quantity of HC injection, typically in the form of vehicle fuel, to the exhaust gas feedstream.

The control system is preferably a distributed control module architecture comprising a plurality of control modules adapted to provide coordinated control of the various vehicle systems including the powertrain system described herein. The control system is operable to monitor inputs from sensing devices, synthesize pertinent information, and execute algorithms to control various actuators to achieve control targets, including such parameters as fuel economy, emissions, performance, driveability, and protection of hardware. The distributed controller architecture includes ECM 5, and User Interface ('UI') 13 which is operably connected to a plurality of other devices through which a vehicle operator typically controls or directs operation of the vehicle and powertrain. Exemplary devices through which a vehicle operator provides input to the UI 13 include an accelerator pedal, a brake pedal, transmission gear selector, and, vehicle speed cruise control. Each of the aforementioned controllers and devices communicate with other controllers, devices, sensors, and actuators via a high-speed local area network ('LAN') bus, shown generally as item 6. The LAN bus 6 allows for structured communication of control parameters and commands between the various processors, control modules, and devices. The specific communication protocol utilized is application-specific. The LAN bus and appropriate protocols provide for robust messaging and multi-controller interfacing between the aforementioned controllers, and other controllers providing functionality such as antilock brakes, traction control, and vehicle stability.

The ECM 5 comprises a central processing unit signally electrically connected to volatile and non-volatile memory devices via data buses. The ECM 5 is operably attached to sensing devices and other output devices to ongoingly monitor and control operation of the engine 10 and exhaust system, as shown. The output devices preferably include subsystems necessary for proper control and operation of the engine, including, by way of example, an air intake system, a fuel injection system, a spark-ignition system (when a spark-ignition engine is used), an exhaust gas recirculation system, and an evaporative control system. The engine sensing devices include devices operable to monitor engine operation, external conditions, and operator demand, and are typically signally attached to the ECM 5 via wiring harnesses.

Algorithms stored in the non-volatile memory devices are executed by the central processing unit and are operable to monitor inputs from the sensing devices and execute engine control and diagnostic routines to control operation of the engine, using preset calibrations. Algorithms are typically executed during preset loop cycles, with each control algorithm executed at least once each loop cycle. Loop cycles are typically executed each 3.125, 6.25, 12.5, 25 and 100 milliseconds during engine operation. Alternatively, control algorithms may be executed in response to occurrence of an event. A cyclical event, e.g. calculation of engine fueling, may be executed each engine cycle. A diagnostic algorithm may be executed once per engine key-on cycle. A diagnostic algorithm may have further limitations including requirements for achieving specific enablement criteria before execution. Use of the ECM 5 to control and diagnose operation of various aspects of the internal combustion engine 10 is well known to one skilled in the art.

Figure 3:
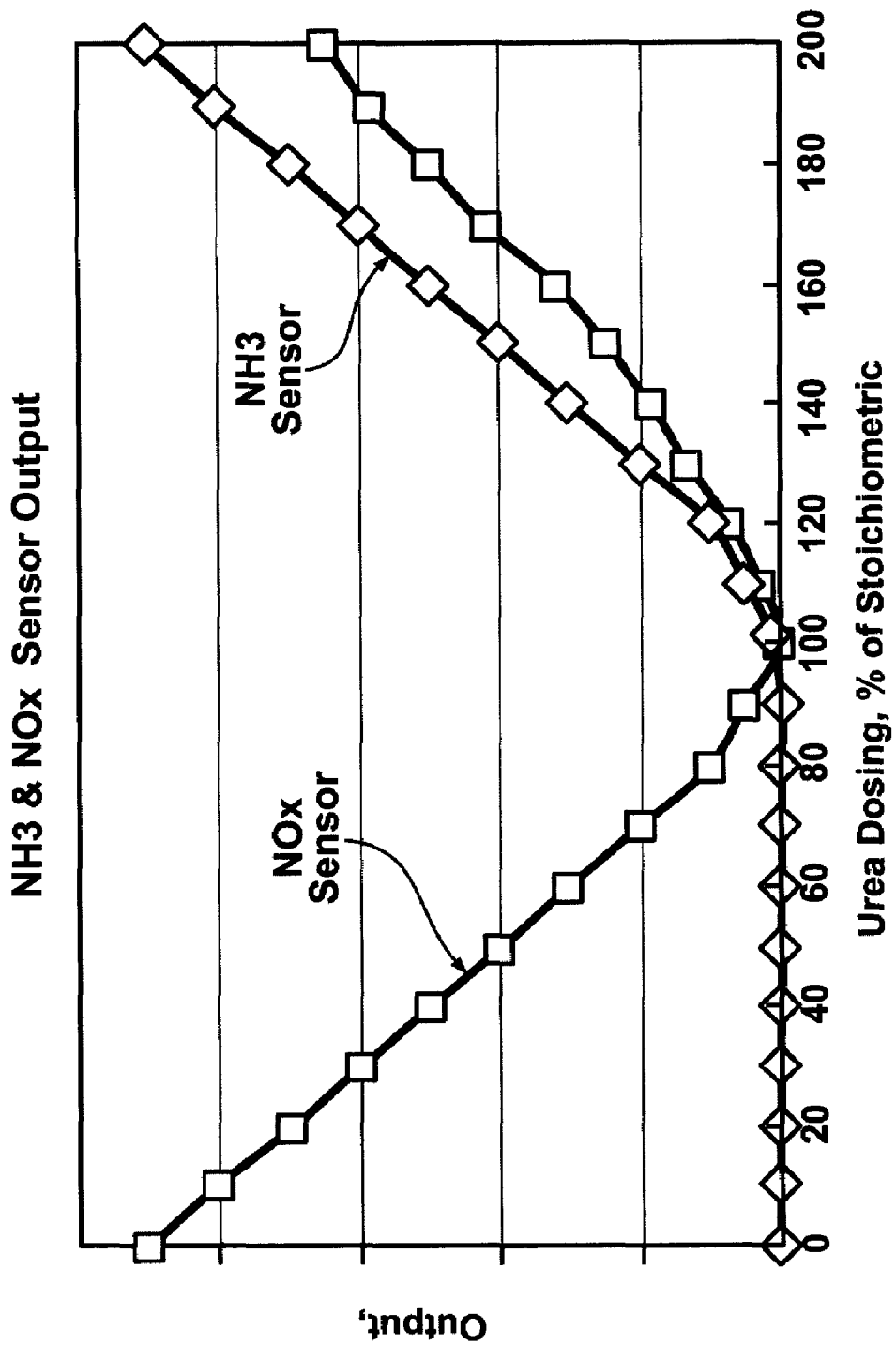
FIG. 3 is a datagraph, in accordance with the present invention.

Referring now to FIG. 3, exemplary output signals for the exhaust gas sensing device 22, 22' are shown. As previously stated, the sensing device can comprise a NOx sensor 22, operative to generate an electrical signal correlatable to a parametric value for NOx concentration, and, alternatively, the exhaust gas sensing device 22, 22' can comprise an ammonia ('$NH_3$') sensor 22', operative to generate an electrical signal correlatable to a parametric value for $NH_3$ concentration. The x-axis comprises a reading of urea dosing, shown as a percent of a urea/NOx stoichiometric ratio, wherein a ratio of 100% comprises a balanced relationship between mass of urea and mass of NOx. When the urea/NOx stoichiometric ratio is greater than 100%, it is indicative of a mixture rich in urea, which is reflected in an output from the $NH_3$ sensor 22' and the NOx sensor 22 greater than zero. When the urea/NOx stoichiometric ratio is less than 100%, it is indicative of a mixture lean in urea, which is reflected in an output from the NOx sensor 22 greater than zero, and an output from the $NH_3$ sensor 22' that is substantially zero.

The invention described herein comprises a monitoring system for the exhaust aftertreatment system comprising the urea dosing injector 16 operable to inject reductant, typically urea, into an exhaust gas feedstream upstream of a selective catalyst reduction device 20. This comprises the engine control module adapted to selectively control a rate of dosing from the urea dosing injector 16; and, monitor inputs from sensing device 22, 22' operative to monitor the selective catalyst reduction device 20. The rate of dosing can be selectively intrusively controlled in specific instances, described hereinafter.

Figure 4:
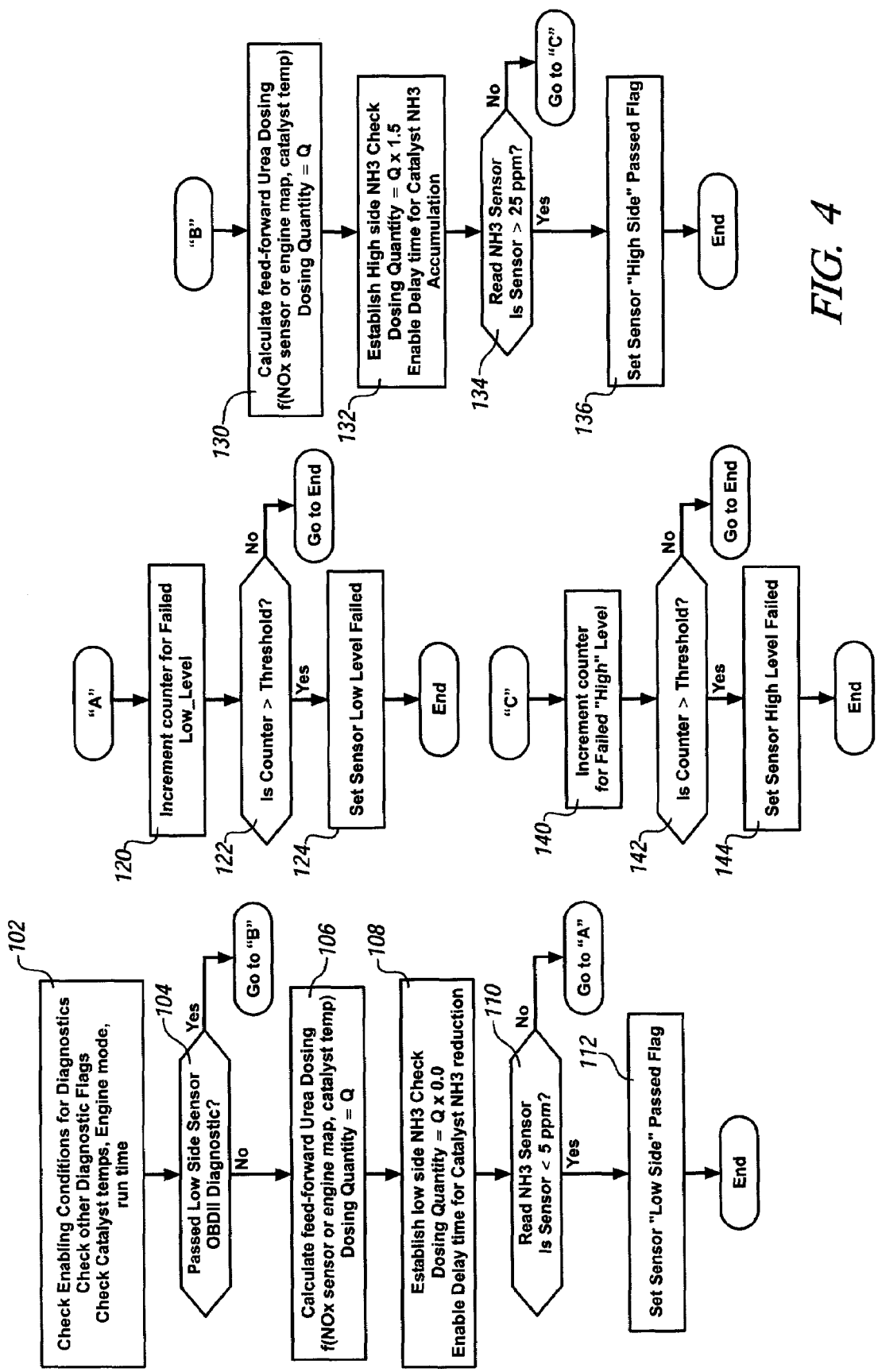
FIGS. 4 through 9 are algorithmic flowcharts, in accordance with the present invention.

Referring now to FIG. 4, a flowchart is depicted for an algorithm operative to execute a method to intrusively monitor the exhaust gas sensing device comprising the $NH_3$ sensor 22' during ongoing operation. The algorithm is preferably executed once per engine key-on cycle in the ECM 5 during one of the loop cycles to monitor and detect faults in the $NH_3$ sensor 22' during operation of the engine and exhaust aftertreatment system described hereinabove. The $NH_3$ sensor 22' is operative to monitor exhaust gases and generate an electrical signal correlatable to a parametric value for $NH_3$ concentration in the exhaust gas feedstream. The $NH_3$ sensor 22' can be mechanized to monitor the exhaust gas feedstream either after the SCR device 20, as shown in FIG. 2 or after having passed through a forward portion thereof, as shown in FIG. 1. Enabling conditions for monitoring the $NH_3$ sensor 22' are monitored, including determining whether other diagnostic flags have been set, such as a failed urea dosing system or a depleted urea storage tank, and determining whether catalyst temperatures are within an allowable range of operation, i.e., the catalyst is warmed up and active, engine operating mode is appropriate, i.e., the engine is operating in normal conditions and not operating in a backup control mode due to a system fault or a form of power enrichment mode, and engine run-time is sufficient (Block 102). During a first execution of the diagnostic after engine start, a low-side test (Blocks 106-124) is conducted, and during a second execution of the diagnostic, a high-side test (Blocks 130-144) is conducted and the low-side and high-side tests are executed accordingly (Block 104). The low-side test comprises first calculating a feed-forward dosing quantity, Q (mass of reductant, in grams), based upon an output signal from NOx sensor 12 placed upstream of the urea dosing injector 16 or based upon an engine speed/load operating point and catalyst temperature (Block 106). The low-side test continues by setting the dosing quantity, Q, to zero, i.e. no dosing, and waiting for a predetermined delay time sufficient to permit $NH_3$ reduction in the SCR device 20 (Block 108). Signal output from the $NH_3$ sensor 22' is read, and interpreted (Block 110). When the sensor reading indicates a concentration of $NH_3$ less than a threshold, in this case, 5 ppm ('parts per million'), it is determined that the sensor has passed the low-side test and "Low Side" Passed Flag is set (Block 112), i.e. it is that there is no $NH_3$ being created in the SCR device, indicative of an expected reading during zero dosing. Low-side testing is thereafter discontinued. During a subsequent execution of the algorithm, the algorithm executes the high-side test, as described hereinbelow (See Block 104). However, when the sensor reading indicates a concentration of $NH_3$ greater than the threshold of 5 ppm at Block 110, it is determined that the sensor has not passed the low-side test, and a fault counter is incremented indicative of the failed test (Block 120), preferably during subsequent engine key-on cycles. When the fault counter exceeds a threshold quantity (Block 122), a sensor low level fault flag is set in the control module (Block 124), and is useable by the control system.

The high-side test comprises first calculating the feed-forward dosing quantity, Q (mass of reductant, in grams), based upon an output signal from NOx sensor 12 placed upstream of the urea dosing injector 16 or based upon the engine speed/load operating point and catalyst temperature (Block 130). The dosing quantity, Q, is increased by a substantial amount, in this instance 50%, and a predetermined delay time sufficient to permit $NH_3$ accumulation in the SCR device 20 elapses (Block 132). Signal output from the $NH_3$ sensor 22' is read, and interpreted (Block 134). When the sensor reading indicates a concentration of $NH_3$ greater than a threshold, in this case, 25 ppm, it is determined that the sensor has passed the high-side test and "High Side" Passed Flag is set (Block 136). High-side testing is thereafter discontinued. However, when the sensor reading indicates a concentration of $NH_3$ less than the threshold of 25 ppm (Block 134), it is determined that the sensor has not passed the high-side test, and a fault counter is incremented indicative of the failed test (Block 140). When the fault counter exceeds a threshold quantity (Block 142), a sensor high level fault flag is set in the control module (Block 144), which is useable by the control system. On subsequent cycles, quantity of reductant, Q, is preferably set at the calculated levels and the system operates without further intrusion. When either a sensor high level fault flag or a sensor low level fault flag is set, the control system is operable to act, such action including illuminating a malfunction indicator lamp in a vehicle instrument panel, disabling other related diagnostic algorithms, and implementing appropriate corrective actions in the control system, including such actions as necessary to prevent harm to other components.

Figure 5:
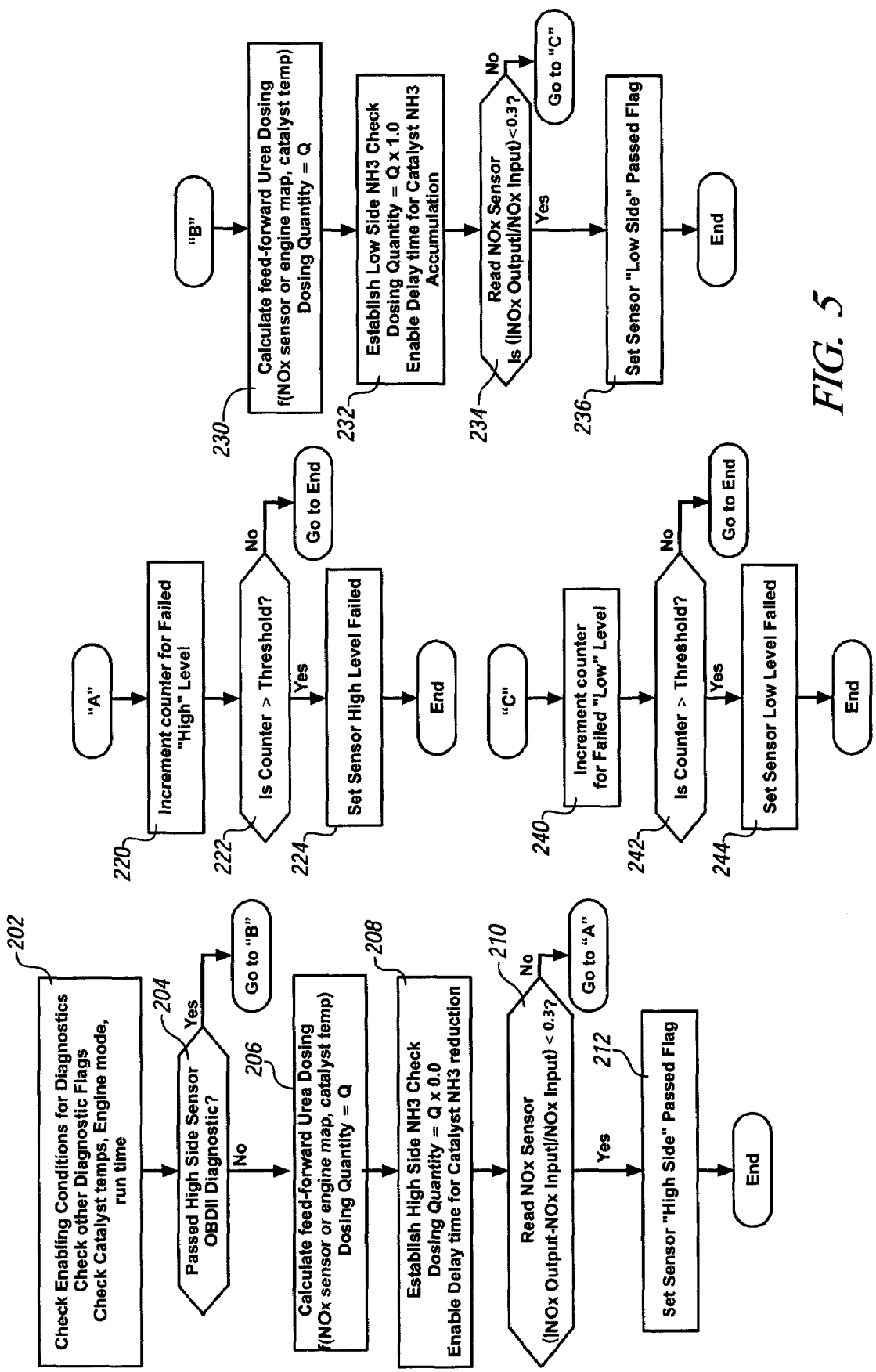

Referring now to FIG. 5, a flowchart is depicted for an algorithm operative to execute a method for intrusively monitoring the exhaust gas sensing device comprising the NOx sensor 22. The algorithm is preferably executed in ECM 5 once per engine key-on cycle during one of the loop cycles to monitor and detect faults in the NOx sensor 22 during operation of the engine and exhaust aftertreatment system described hereinabove. The NOx sensor 22 is operative to monitor exhaust gases and generate an electrical signal correlatable to a parametric value for NOx concentration in the exhaust gas feedstream. The algorithmic strategy for monitoring the NOx sensor 22 is analogous to the strategy for monitoring the NH$_3$ sensor 22', described hereinabove with reference to FIG. 4, with thresholds that are based upon the signal output of the NOx sensor.

Referring again to FIG. 5, the flowchart for the algorithm is now described. The NOx sensor 22 can be mechanized to monitor the exhaust gas feedstream either after the SCR catalyst 20, or after having passed through a forward portion thereof. Enabling conditions for monitoring the NOx sensor 22 are monitored, including determining whether other diagnostic flags have been set and determining whether catalyst temperatures are within allowable range of operation, engine operating mode is appropriate, and engine run-time is sufficient (Block 202). During a first execution of the diagnostic after engine start, a high-side test (Blocks 206-224) is conducted, and during a second execution of the diagnostic, a low-side test (Blocks 230-244) is conducted and the low-side and high-side tests are executed accordingly (Block 104). The high-side test comprises first calculating a feed-forward dosing quantity, Q (mass of reductant, in grams), based upon an output signal from NOx sensor 12 placed upstream of the urea dosing injector 16 or based upon an engine speed/load operating point and a catalyst temperature effective for NOx reduction (Block 206). The high-side test continues by setting the dosing quantity, Q, to zero, i.e. no dosing, and waiting for a predetermined delay time sufficient to permit NH$_3$ reduction in the SCR device 20 and a corresponding increase in NOx emissions (Block 208). Signal output from the NOx sensor 22 is read, and interpreted (Block 210). NOx reduction through the catalyst is calculated as [NOx Output−NOx Input]/NOx Input, wherein NOx Input comprises the known NOx input to the catalyst, and NOx Output comprises the reading of the NOx sensor 22. With urea dosing disabled, the NOx input to SCR device 20 is expected to be substantially the same as the NOx output from the SCR device 20, and the sensor signals should reflect this. Therefore, when NOx reduction through the SCR device 20 is less than a threshold value, shown here as 0.3, with no urea dosing, it is determined that the sensor has passed the high-side test and "High Side" Passed Flag is set (Block 212). High-side testing is thereafter discontinued. During a subsequent execution of the algorithm, the algorithm executes the low-side test, as described hereinbelow (See Block 204). However, when the sensor reading indicates a NOx reduction through the catalyst greater than the threshold of 0.3 at Block 210, it is determined that the sensor has not passed the high-side test, and a fault counter is incremented indicative of the failed test (Block 220). When the fault counter exceeds a threshold quantity (Block 222), a sensor high level fault flag is set in the control module (Block 224), which can be used by the control system.

The low-side test comprises first calculating the feed-forward dosing quantity, Q (mass of reductant, in grams), based upon an output signal from NOx sensor 12 placed upstream of the urea dosing injector 16 or based upon the engine speed/load operating point and the catalyst temperature (Block 230). The high-side test continues by executing the dosing quantity, Q, and waiting for a predetermined delay time sufficient to permit NH$_3$ accumulation in the SCR device 20, with corresponding reduction in NOx emissions (Block 232). Signal output from the NOx sensor 22 is read, and interpreted (Block 234). This includes calculating a value for NOx output/NOx input. When NOx output/NOx input is less than a threshold, in this case, 0.3, it is determined that the sensor has passed the low-side test and "Low Side" Passed Flag is set (Block 236), and testing is discontinued. However, when the sensor reading indicates NOx output/NOx input is greater than the threshold of 0.3 at block 234, it is determined that the sensor has not passed the low-side test, and a fault counter is incremented indicative of the failed test (Block 240). When the fault counter exceeds a threshold quantity (Block 242), a sensor high level fault flag is set in the control module (Block 244), which can be used by the control system. On subsequent cycles, quantity of reductant, Q, is preferably set at the calculated levels and the system operates without further intrusion. When either a sensor high level fault flag or a sensor low level fault flag is set, the control system is operable to act, such action including illuminating a malfunction indicator lamp in a vehicle instrument panel, disabling other related diagnostic algorithms, and implementing appropriate corrective actions in the control system, including such actions as necessary to prevent harm to other components.

Figure 6:
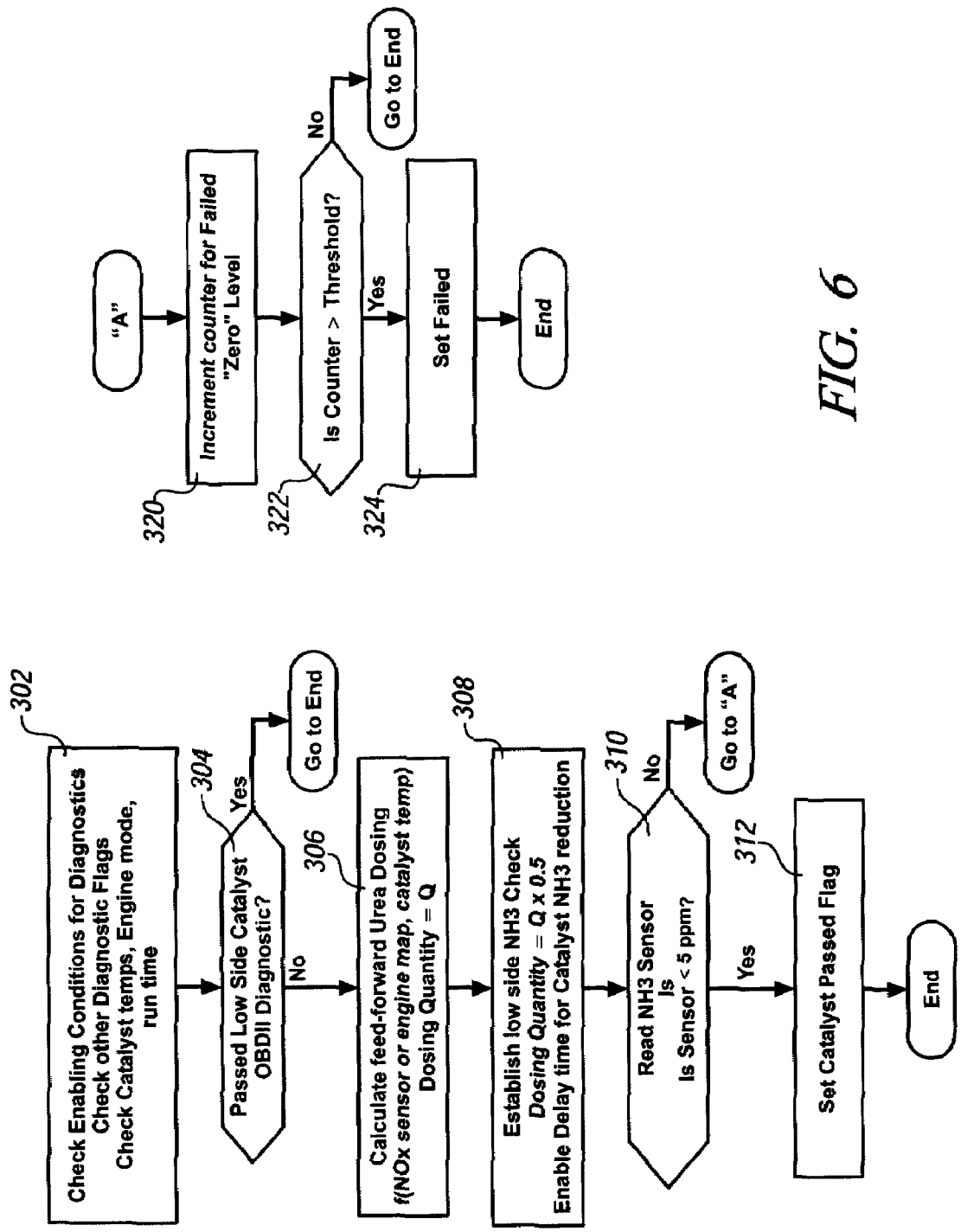

Referring now to FIG. 6, a flowchart is depicted for an algorithm operative to execute a method for intrusively monitoring the SCR device 20 using information from the NH$_3$ sensor 22'. The algorithm is preferably executed in ECM 5 once per engine key-on cycle during one of the loop cycles to monitor and detect faults in the SCR device 20. The NH$_3$ sensor 22' is operative to monitor exhaust gases and generate an electrical signal correlatable to a parametric value for NH$_3$ concentration in the exhaust gas feedstream after the SCR device 20.

The NH$_3$ sensor 22' can be mechanized to monitor the exhaust gas feedstream either after the SCR device 20, as shown in FIG. 2 or after having passed through a forward portion thereof, as shown in FIG. 1. Enabling conditions for monitoring the SCR device 20 are monitored, including determining whether other diagnostic flags have been set, and determining whether catalyst temperatures are within allowable range of operation, engine operating mode is appropriate, and engine run-time is sufficient (Block 302). The diagnostic primarily comprises a low-side diagnostic test (Block 304). The low-side test comprises first calculating a feed-forward dosing quantity, Q (mass of reductant, in grams), based upon an output signal from NOx sensor 12 placed upstream of the urea dosing injector 16 or based upon an engine speed/load operating point and catalyst temperature (Block 306). The low-side test continues by reducing the dosing quantity, Q, to 50% of its value, and waiting for a predetermined delay time sufficient to permit NH$_3$ reduction in the SCR device 20 and a corresponding increase in NOx emissions (Block 308). Signal output from the NH$_3$ sensor 22' is read, and interpreted (Block 310). When signal output from the NH$_3$ sensor 22' is less than a threshold, in this case 5 ppm, it is determined that the SCR device has passed the low-side test and Catalyst Passed Flag is set (Block 312). When the sensor reading indicates ammonia breakthrough, or slip, it is determined that the SCR device 20 has not passed the low-side test, and a fault counter is incremented indicative of the failed test (Block 320). When the fault counter exceeds a threshold quantity (Block 322), a catalyst low level fault flag is set in the control module (Block 324), which can be used by the control system. When the catalyst low level fault flag is set, the control system is operable to act, such action including illuminating a malfunction indicator lamp in a vehicle instrument panel, disabling other related diagnostic algorithms, and implementing appropriate corrective actions in the control system, including such actions as necessary to prevent harm to other components.

Figure 7:
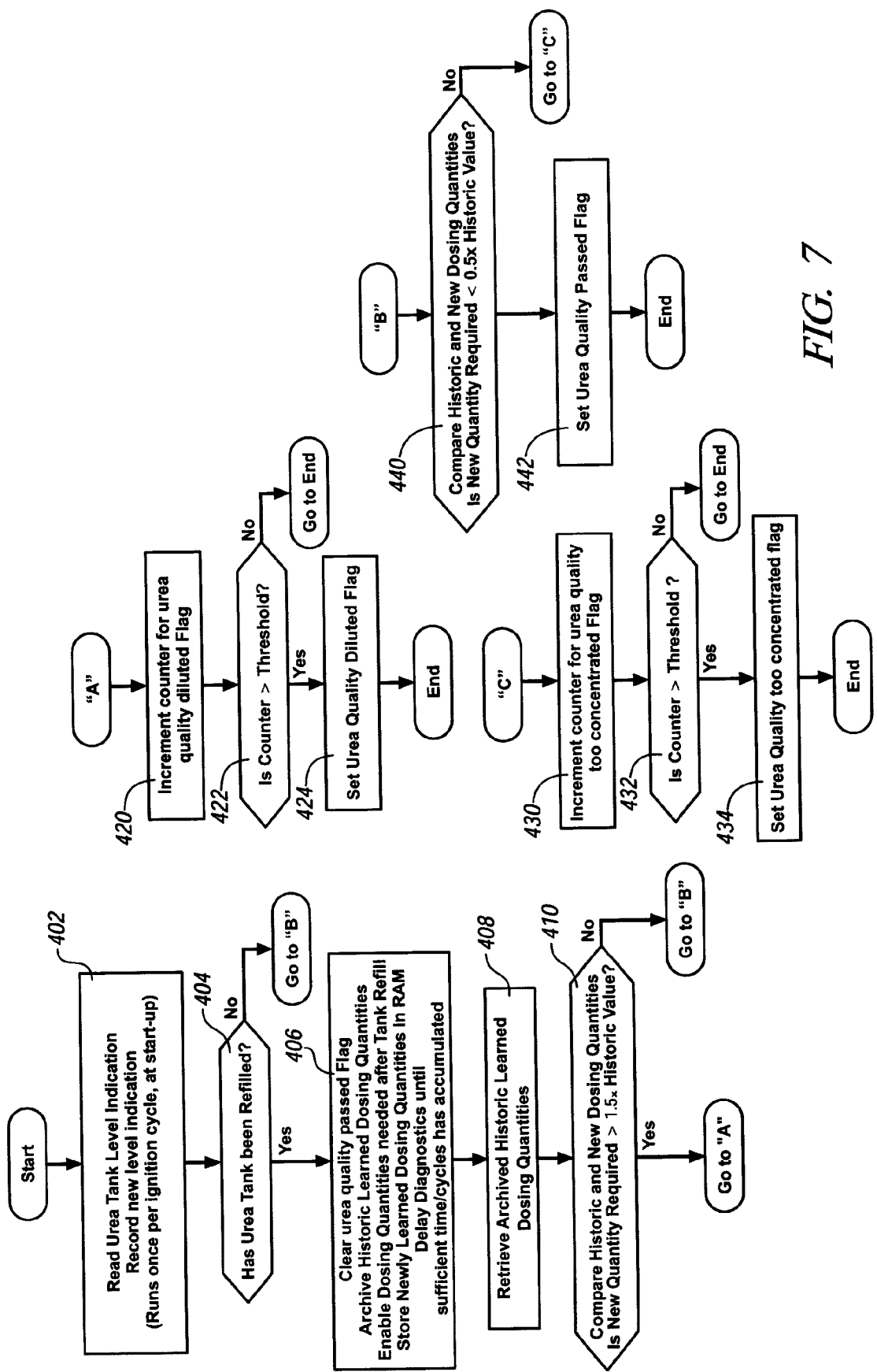

Referring now to FIG. 7, a flowchart is depicted for an algorithm operative to execute a method for monitoring reductant quality, in this example urea. The control module is adapted to execute a closed-loop control scheme for controlling the rate of dosing from the urea dosing injector 16 to the exhaust gas feedstream upstream to the SCR device 20 based upon the monitored signal inputs from the sensing device 22. An exemplary method and apparatus for closed-loop control of urea injection is described in co-pending, co-assigned U.S. patent application Ser. No. 11/459,737, entitled METHOD AND APPARATUS FOR UREA INJECTION IN AN EXHAUST AFTERMEATMENT SYSTEM. The referenced closed-loop control scheme determines a value for a dosing multiplier which is based upon feedback from the sensing device 22 during ongoing operation.

The algorithm comprises the following steps. At engine key-on and start, fluid level is read and recorded for a tank (not shown) adapted to supply reductant to the urea dosing injector 16. This typically operates once per ignition cycle at start up (Block 402). When it is determined that the tank has been refilled (Block 404), a series of events are executed. The urea quality passed flag is cleared, and the current value for dosing quantity injected to the exhaust gas feedstream by the urea dosing injector 16 is stored as a historic dosing value in one of the non-volatile memory devices of the control system. Preferably, the current value for dosing quantity is statistically filtered with previously observed "current values" to facilitate determination of a statistically representative historic value. Closed-loop dosing control is enabled to determine a new dosing quantity, comprising a requisite quantity of reductant necessary for proper operation of the SCR device. This operation includes a time delay to allow the closed-loop operation to stabilize (Block 406). After the time delay, the new dosing quantity is compared to the historic dosing value stored in non-volatile memory (Block 408, 410). When the new dosing quantity is of a value that is above a threshold, in this application fifty percent greater than the historic value, it is determined that urea quality may be diluted, with a corresponding flag set and counter incremented (Block 420). When the counter exceeds a threshold value (Block 422), a urea quality diluted flag is set (Block 424). When the new dosing quantity is of a value that is below a second threshold (Block 440), in this application fifty percent less than the historic dosing value, it is determined that urea quality may be over-concentrated, with a corresponding flag set and counter incremented (Block 430). When the counter exceeds a threshold value (Block 432), a urea quality over-concentrated flag is set (Block 434).

Figure 8:
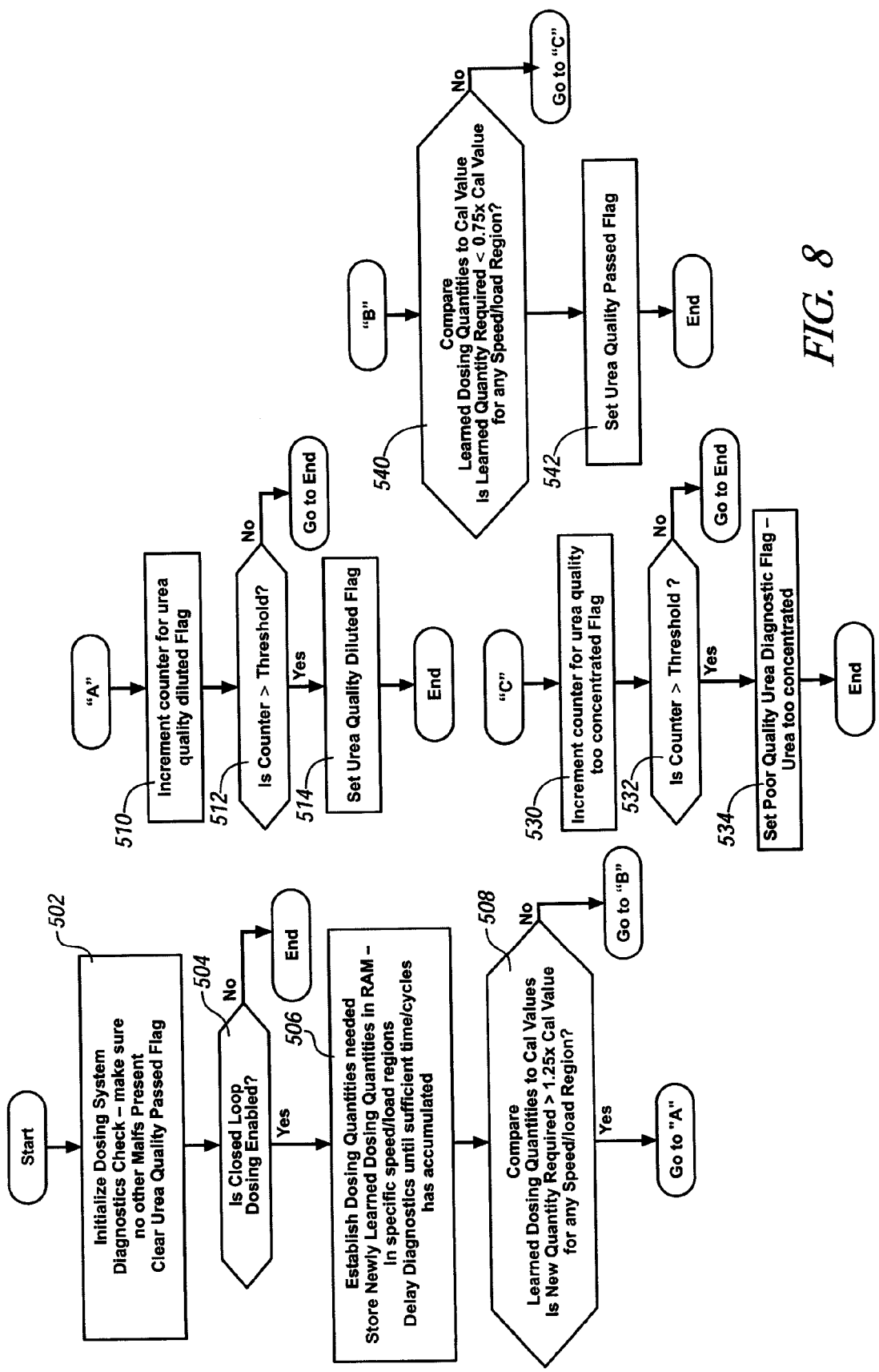

Referring now to FIG. 8, a flowchart is depicted for an algorithm operative to execute an alternative method for monitoring reductant quality, in this example urea. In this embodiment, NOx sensor 26 is upstream of the urea injector, and there is sensing device 22, 22' downstream of the SCR catalyst 20. The control module is adapted to execute the aforementioned closed-loop control scheme for controlling the rate of dosing from the urea dosing injector 16 to the exhaust gas feedstream upstream to the SCR device 20 based upon the monitored signal inputs from the sensing device 22, 22'. The referenced closed-loop control scheme determines a value for the dosing multiplier which is based upon feedback from the sensing device 22, 22' during ongoing operation.

The algorithm comprises the following steps. At engine key-on and start, the dosing system is initialized, to ensure there are no other malfunctions and to clear or reset the urea quality passed flag (Block 502). It is determined that closed loop dosing is enabled (Block 504), and new dosing quantities are established, using the closed loop control. A plurality of dosing quantities is learned and stored in RAM, corresponding to a range of engine speed/load operating regions (Block 506). Operation of diagnostic algorithms is delayed until a sufficient time has elapsed, or cycles have accumulated. The newly learned dosing quantities are compared to predetermined calibration values for dosing quantity for each speed/load region (Block 508). When any of the newly learned dosing quantities exceeds the predetermined calibration values for dosing quantity for any speed/load region multiplied by a factor of 1.25, it is determined that urea quality may be diluted and a counter incremented (Block 510), and a corresponding flag set when the counter exceeds a threshold count (Blocks 512-514). When the newly learned dosing quantities do not exceed the predetermined calibration values for dosing quantity for any speed/load region multiplied by the factor of 1.25, the newly learned dosing quantities are compared to the predetermined calibration values for dosing quantity for any speed/load region multiplied by a factor of 0.75 (Block 540). When it is determined that the dosing quantity is greater than the aforementioned for each speed/load region, the urea quality passed flag is set (Block 542). When it is determined that the newly learned dosing quantities are less than the predetermined calibration values for dosing quantity for any speed/load region multiplied by a factor of 0.75, it is determined that urea quality may be too concentrated and a counter incremented (Block 530), and a corresponding flag set when the counter exceeds a threshold count (Blocks 532-534).

Figure 9:
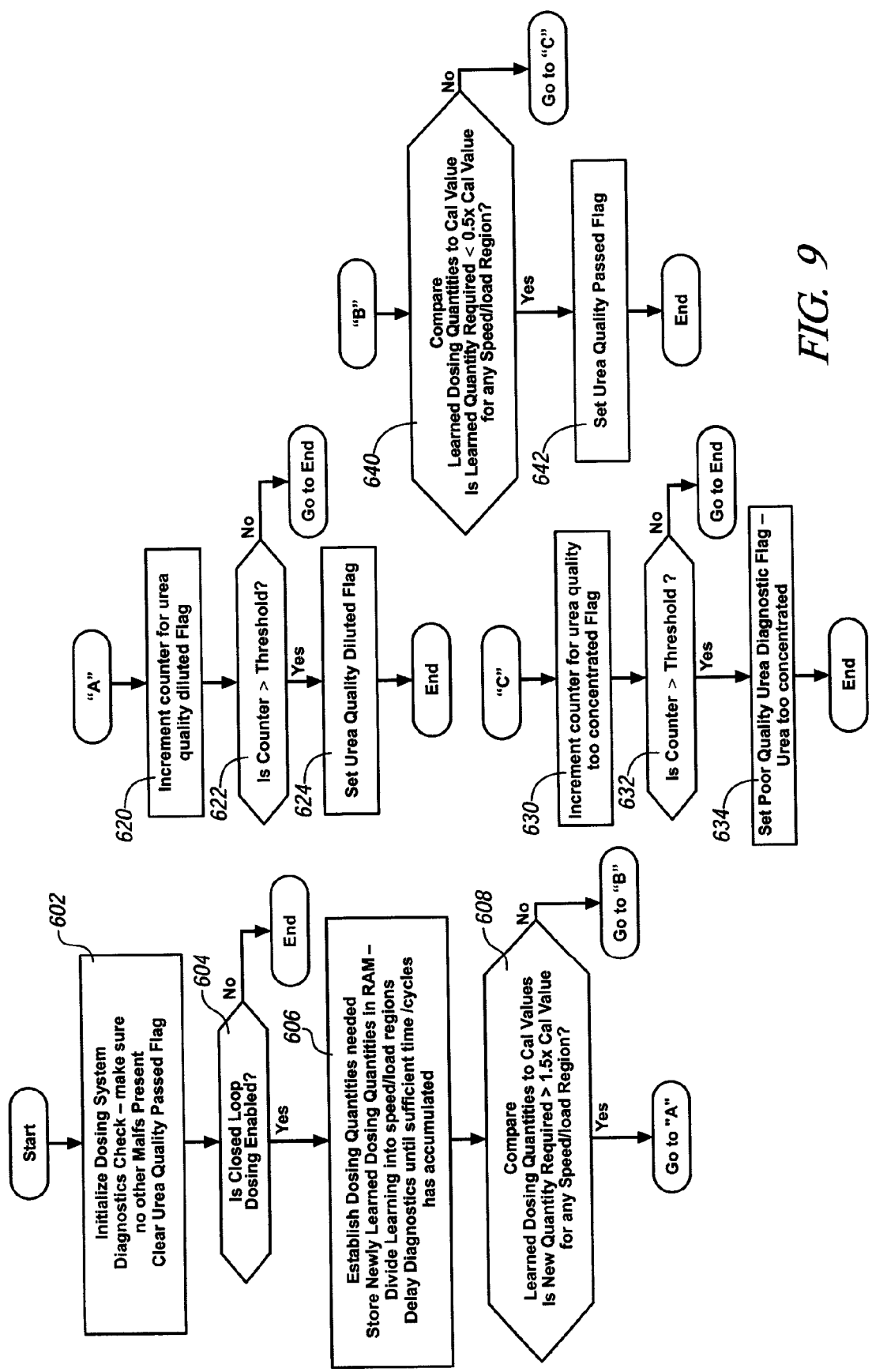

Referring now to FIG. 9, a flowchart is depicted for an alternative embodiment of an algorithm comprising a method for monitoring reductant quality, in this example urea. In this embodiment, NOx concentration in the exhaust gas flowstream is determined based upon a predetermined calibration that correlates NOx concentration to engine speed/load operating regions. There is the sensing device 22, 22' downstream of the SCR catalyst 20. The control module is adapted to execute the aforementioned closed-loop control scheme for controlling the rate of dosing from the urea dosing injector 16 to the exhaust gas feedstream upstream to the SCR device 20 based upon the monitored signal inputs from the downstream sensing device 22, 22'. The referenced closed-loop control scheme determines a value for the dosing multiplier which is based upon feedback from the downstream sensing device 22, 22' during ongoing operation.

The algorithm comprises the following steps. At engine key-on and start, the dosing system is initialized, to ensure there are no other malfunctions and to clear or reset the urea quality passed flag (Block 602). It is determined that closed loop dosing is enabled (Block 604), and new dosing quantities are established, using the closed loop control. A plurality of dosing quantities is learned and stored in RAM, corresponding to a range of engine speed/load operating regions (Block 606). Operation of diagnostic algorithms is delayed until a sufficient time has elapsed, or cycles have accumulated. The newly learned dosing quantities are compared to predetermined calibration values for dosing quantity for each speed/load region (Block 608). When any of the newly learned dosing quantities exceeds the predetermined calibration values for dosing quantity for any speed/load region multiplied by a factor of 1.50, it is determined that urea quality may be diluted and a counter incremented (Block 620), and a corresponding flag set when the counter exceeds a threshold count (Blocks 622-624). When the newly learned dosing quantities do not exceed the predetermined calibration values for dosing quantity for any speed/load region multiplied by the factor of 1.50, the newly learned dosing quantities are compared to the predetermined calibration values for dosing quantity for any speed/load region multiplied by a factor of 0.50 (Block 640). When it is determined that the dosing quantity is greater than the aforementioned for each speed/load region, the urea quality passed flag is set (Block 642). When it is determined that the newly learned dosing quantities are less than the predetermined calibration values for dosing quantity for any speed/load region multiplied by a factor of 0.50, it is determined that urea quality may be too concentrated and a counter incremented (Block 630), and a corresponding flag set when the counter exceeds a threshold count (Blocks 632-634). The multiplication factors in this embodiment are increased to accommodate a potential increase in measurement error associated with the use of the predetermined calibration that correlates NOx concentration to engine speed/load operating regions.

When either a urea quality diluted flag or urea quality over-concentrated flag is set in any of the embodiments described hereinabove, the control system is operable to act, such action including illuminating the malfunction indicator lamp in the vehicle instrument panel, disabling other related diagnostic algorithms, and implementing appropriate corrective actions in the control system, including such actions as necessary to prevent harm to other components.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Method for monitoring an exhaust aftertreatment system comprising an injecting device operable to inject reductant into an exhaust gas feedstream upstream of a selective catalyst reduction device, comprising:
   determining a stoichiometric reductant/NOx ratio;
   controlling a rate of dosing from the injecting device to a non-stoichiometric reductant/NOx dosing rate;
   monitoring signal inputs from a sensing device that monitors the exhaust gas feedstream subsequent to passing though at least a portion of the selective catalytic reduction device; and,
   detecting a fault in the exhaust aftertreatment system based upon the monitored signal inputs solely from the sensing device subsequent to controlling the rate of dosing from the injecting device to the non-stoichiometric reductant/NOx dosing rate.

2. The method of claim 1, wherein controlling the rate of dosing from the injecting device comprises one of selectively intrusively increasing and decreasing the rate of dosing from the injecting device.

3. The method of claim 2, comprising substantially completely discontinuing the rate of dosing for a predetermined amount of time.

4. The method of claim 3, further comprising detecting a fault in the sensing device when the signal input from the sensing device is above a first threshold and the rate of dosing is substantially completely discontinued for the predetermined amount of time.

5. The method of claim 2, comprising substantially increasing the rate of dosing for a predetermined amount of time.

6. The method of claim 5, further comprising detecting a fault in one of the sensing device and the selective catalyst reduction device when the signal input from the sensing device is below a second threshold and the rate of dosing is substantially increased for the predetermined amount of time.

7. The method of claim 2, comprising substantially reducing the rate of reductant dosing for a predetermined amount of time.

8. The method of claim 7, further comprising detecting a fault in the selective catalyst reduction device when the signal input from the sensing device is above a first threshold.

9. The method of claim 8, wherein the sensing device operative to monitor the selective catalyst reduction device comprises an ammonia sensor.

10. Monitoring system for an exhaust aftertreatment system comprising an injecting device operable to inject reductant into an exhaust gas feedstream upstream of a selective catalyst reduction device, comprising:
    a control module, adapted to:
       determine a stoichiometric reductant/NOx ratio;
       control a rate of reductant dosing from the injecting device to a non-stoichiometric reductant/NOx dosing rate;
       monitor inputs from a sensing device that monitors the exhaust gas feedstream subsequent to passing though at least a portion of the selective catalytic reduction device, and,
       detect a fault in the exhaust aftertreatment system based upon the monitored inputs solely from the sensing device subsequent to controlling the rate of reductant dosing from the injecting device to the non-stoichiometric reductant/NOx dosing rate.

11. The monitoring system of claim 10, wherein the control module is adapted to one of selectively intrusively increase and decrease the rate of reductant dosing by the injecting device.

12. The monitoring system of claim 11, comprising the control module operable to substantially completely discontinue the rate of dosing for a predetermined amount of time.

13. The monitoring system of claim 12, wherein the control module is operable to detect a fault in the sensing device when the signal input from the sensing device is above a first threshold.

14. The monitoring system of claim 11, further comprising the control module operable to substantially increase the rate of reductant dosing for a predetermined amount of time.

15. The monitoring system of claim 14, wherein the control module is operable to detect a fault in the sensing device when the signal input from the sensing device is below a second threshold.

16. The monitoring system of claim 11, comprising the control module operable to substantially reduce the rate of reductant dosing for a predetermined amount of time.

17. The monitoring system of claim 16, wherein the control module is operable to detect a fault in the selective catalyst reduction device when the signal input from the sensing device is above a first threshold.

18. The monitoring system of claim 17, wherein the sensing device operative to monitor the selective catalyst reduction device comprises an ammonia sensor.

19. Monitoring system for an exhaust aftertreatment system comprising an injecting device operable to inject reductant into an exhaust gas feedstream upstream of a selective catalyst reduction device, comprising:
    a control module, adapted to:
       control a rate of reductant dosing from the injecting device;
       monitor inputs from a sensing device operative to monitor the selective catalyst reduction device;
       determine a closed loop correction factor to control the rate of reductant dosing from the injecting device based upon the monitored signal inputs from the sensing device;
       monitor refilling events of a reductant storage tank; and,
       identify a fault in reductant quality when a change in the closed loop correction factor exceeds a threshold after a refilling event of the reductant storage tank.

20. Monitoring system for an exhaust aftertreatment system comprising an injecting device operable to inject reductant into an exhaust gas feedstream upstream of a selective catalyst reduction device, comprising:

a control module, adapted to:

control a rate of reductant dosing from the injecting device;

monitor inputs from a sensing device operative to monitor the selective catalyst reduction device; determine a plurality of closed-loop correction factors to control the rate of reductant dosing by the injecting device, each closed-loop correction factor based upon the monitored signal inputs from the sensing device in an engine speed/load operating region; and, identify a fault in reductant quality when a change in one of the closed loop correction factors exceeds a predetermined threshold for the engine speed/load operating region.

* * * * *